(12) United States Patent
Gillespie, III et al.

(10) Patent No.: US 9,938,478 B2
(45) Date of Patent: Apr. 10, 2018

(54) DEVOLATILIZATION SYSTEM AND METHODS THEREOF

(71) Applicant: Sustainable Waste Power Systems, Inc., Kingston, NY (US)

(72) Inventors: Michael Joseph Gillespie, III, Shohola, PA (US); Christopher Paul Gillespie, Ridgefield, CT (US)

(73) Assignee: Sustainable Waste Power Systems, Inc., Kingston, NY (US)

( * ) Notice: Subject to any disclaimer, the term of this patent is extended or adjusted under 35 U.S.C. 154(b) by 373 days.

(21) Appl. No.: 14/569,018

(22) Filed: Dec. 12, 2014

(65) Prior Publication Data

US 2016/0168470 A1    Jun. 16, 2016

(51) Int. Cl.
| | |
|---|---|
| *B01D 3/00* | (2006.01) |
| *C10L 9/08* | (2006.01) |
| *C10L 3/08* | (2006.01) |
| *B01J 19/24* | (2006.01) |
| *B01J 3/04* | (2006.01) |

(52) U.S. Cl.
CPC .............. *C10L 9/086* (2013.01); *B01J 3/042* (2013.01); *B01J 19/2425* (2013.01); *C10L 3/08* (2013.01); *C10L 9/08* (2013.01); *B01J 2219/0006* (2013.01); *B01J 2219/0027* (2013.01); *B01J 2219/00063* (2013.01); *B01J 2219/00065* (2013.01); *B01J 2219/00085* (2013.01); *B01J 2219/00162* (2013.01); *C10J 2300/0906* (2013.01); *C10J 2300/0916* (2013.01); *C10J 2300/1246* (2013.01); *C10J 2300/1662* (2013.01); *C10L 2290/04* (2013.01); *C10L 2290/06* (2013.01); *C10L 2290/28* (2013.01); *C10L 2290/58* (2013.01); *C10L 2290/60* (2013.01)

(58) Field of Classification Search
CPC .............................. C10B 15/00; B01J 8/0285
USPC .......... 422/198, 600, 201, 202, 610; 165/45; 202/232, 233, 260, 270
See application file for complete search history.

(56) References Cited

U.S. PATENT DOCUMENTS

| | | | |
|---|---|---|---|
| 5,764,716 A | 6/1998 | Eckardt | |
| 5,779,994 A * | 7/1998 | Kupper | ................ B01J 19/0013 422/201 |
| 8,690,977 B2 * | 4/2014 | Gillespie, III | ............ F02C 3/28 48/197 R |

(Continued)

FOREIGN PATENT DOCUMENTS

EP         1011856        4/2003

*Primary Examiner* — Nina Bhat
(74) *Attorney, Agent, or Firm* — Baker Hostetler LLP

(57) ABSTRACT

A system and method for devolatilizing a carbonaceous feedstock are provided. The system includes a devolatilization reactor having a unit shell, at least one tube bundle, a pump, and a control valve. The unit shell is configured to allow a heating fluid to flow within. The at least one tube bundle is configured to allow the feedstock to flow within the tube bundle and further configured to be positioned at least partially within the unit shell. The tube bundle comprises at least one tube and at least one tube bend. The at least one tube bend is disposed external to the unit shell. The pump is configured to pump the feedstock into the at least one tube bundle. The control valve is configured to control the flow rate of feedstock into the at least one tube bundle.

14 Claims, 6 Drawing Sheets

(56) References Cited

U.S. PATENT DOCUMENTS

| | | | |
|---|---|---|---|
| 2004/0156763 A1* | 8/2004 | Wood | B01F 5/0453 |
| | | | 422/600 |
| 2004/0228432 A1 | 11/2004 | Glass et al. | |
| 2008/0000622 A1* | 1/2008 | Hugues | B01J 8/22 |
| | | | 165/145 |
| 2009/0093555 A1* | 4/2009 | Stites | C01B 3/16 |
| | | | 518/702 |
| 2009/0250437 A1 | 10/2009 | King, III et al. | |
| 2011/0092726 A1 | 4/2011 | Clarke | |

\* cited by examiner

DEVOLATILIZATION SYSTEM AND METHODS THEREOF

TECHNICAL FIELD

This disclosure relates generally to machines that devolatilize materials, and more particularly, to a system and method that accepts and devolatilizes a carbonaceous feedstock.

BACKGROUND

Devolatilization technology and reactors have been around for some time. Devolatilization reactors are used to dry and extract light gaseous materials from a feedstock material. Generally, a bed of feedstock is heated within a vessel or stages within multiple vessels. The feedstock is subjected to heating at either atmospheric or raised pressure, and may be in the presence of steam, oxygen, air, and/or some other gas to release the volatiles within the feedstock.

There are a variety of systems and methods for devolatilizing a material. Devolatilization is a mechanism for all thermochemical processes (pyrolysis, combustion, gasification), especially for a feedstock with a large amount of volatile matter. Current technology exists for removing volatiles from wood material, energy crops, agricultural and food residues, or the like. Although current techniques may provide a way for devolatilization, they have limited control over the process which can minimize operating efficiency.

In addition to limited control of the devolatilization process, many other issues exist with current systems, including: material bridging, the potential for mixing heating fluids with feedstock, limited residency time within the reactor, minimal surface area between the feedstock container and heating fluid, and limited ability to measure thermodynamic properties of the feedstock during devolatilization. This list is merely exemplary and other issues and challenges certainly exist in practice.

Thus, an improved devolatilization system for chemically separating volatiles from fixed carbon in feedstock is desired to improve the performance and quality of the feedstock devolatilization process.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

One embodiment of the present disclosure includes a reactor devolatilizing a feedstock. The reactor includes a unit shell and at least one tube bend. The unit shell is configured to allow a heating fluid to flow within the unit shell. The at least one tube bundle is configured to allow the feedstock to flow within the tube bundle and further configured to be positioned at least partially within the unit shell. The at least one tube bundle comprises at least one tube and at least one tube bend. The at least one tube and the at least one tube bend are configured to couple to each other. The at least one tube bend is disposed external to the unit shell.

Another embodiment of the present disclosure includes a system for devolatilizing a feedstock. The system includes a devolatilization reactor having a unit shell, at least one tube bundle, a pump, and a control valve. The unit shell is configured to allow a heating fluid to flow within. The at least one tube bundle is configured to allow the feedstock to flow within the tube bundle and further configured to be positioned at least partially within the unit shell. The tube bundle includes at least one tube and at least one tube bend. The at least one tube bend is configured to couple to the at least one tube. The at least one tube bend is disposed external to the unit shell. The pump is configured to pump the feedstock into the at least one tube bundle. The control valve is configured to control the flow rate of feedstock into the at least one tube bundle.

Another embodiment of the present disclosure includes a method for devolatilizing a feedstock in a devolatilization reactor. The devolatilization reactor has a unit shell and a tube bundle. The tube bundle is disposed within the unit shell. The tube bundle has at least one tube and at least one tube bend. The tube bend is configured to couple to the at least one tube. The method includes admitting the feedstock into the tube bundle. The method further includes sensing the temperature of the feedstock in the at least one tube bend. The method further includes heating the feedstock with a heating medium. The heating medium is contained within the unit shell and is in contact with at least a portion of the tube bundle.

DETAILED DESCRIPTION OF ILLUSTRATIVE EMBODIMENTS

The disclosure relates generally to a system and method for devolatilizing carbonaceous feedstock. The method includes providing the feedstock to a devolatilization system, whereby the feedstock is heated and substantially pulverized. While the feedstock is being heated, the materials composing the feedstock, including entrained volatiles and water, are thermally converted into simple carbon constituents that may be in the form of synthetic natural gas after separation from the water and devolatilized solid fraction, or may be used in a gasification reactor to further convert the devolatilized solid fractions and volatiles together into a product SynGas.

As used herein, the term "feedstock" generally means any carbon-bearing material that may be fed into a system for processing purposes. It should be appreciated that the output of one system may serve as the feedstock input material for another system, such as a gasifier 112 as illustrated in FIG.

1. Further, the devolatilization method may process any type of carbonaceous feedstock, utilizing similarly physically designed devolatilization systems for any given feedstock. The systems may be modular and may be tuned in terms of capacity and reaction parameters.

Figure 1:
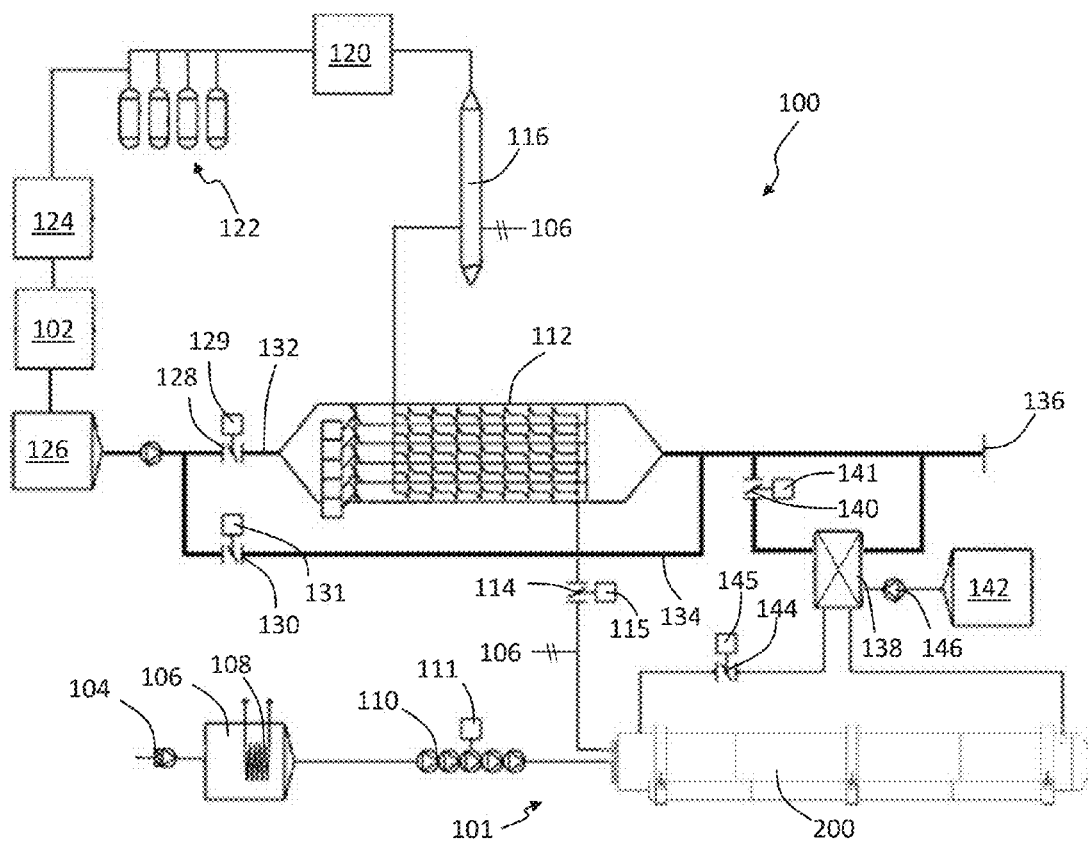
FIG. 1 is a schematic of a devolatilization system, according to one aspect of the disclosure.

FIG. 1 is a schematic of an embodiment of a power plant system 100 ("power plant") which comprises a devolatilization system 101 that includes a pressure pump 110, a devolatilization reactor 200, and a control valve 114. The power plant 100 may utilize fuel cells as the primary energy generator 102. The power plant 100 may provide both power generation and waste disposal. In other embodiments, the power plant 100 may produce district natural gas and utilize the gas for mechanical power generation for use in a third party process. It should be appreciated that the power plant 100 may be arranged in a variety of configurations.

Continuing with FIG. 1, the acceptance of feedstock, which may be in any form, for example, municipal garbage, sewage, agricultural waste, consumer waste, and any combination thereof, and the like, may enter in through grinders 104, and deposited in one or more holding tanks 106. The holding tank 106 may include tank heating coils 108, for preheating the feedstock prior to entering the devolatilization reactor 200. Feedstock may also include dedicated waste handling systems such as farm waste, food processing waste, etc. Feedstock can be sourced from any number of carbon-based materials. The power plant 100 may be configured to accept any combination of these feedstock streams.

It should be appreciated that there may be more than one grinder 104, or none, and that the feedstock may flow through a series of grinders and pumps which grind the feedstock to a variety of dimensions. These may include fine grinder pumps, secondary grinder pumps, and other similar mechanisms. The feedstock may be ground to sizes as small as 0.005 inches or as large as 6 inches. This ground form of feedstock may be referred to as "feedstock slurry." Additionally, there may be more than one holding tank 106, whereby feedstock having varying properties may be stored separately.

After the feedstock is ground, the resulting slurry is stored in the one or more storage tanks 106. A pressure pump 110 may be used to pump the slurry into the devolatilization reactor 200. The flow of feedstock may be controlled by the reactor control valve 114 by providing back-pressure to the reactor 200. The slurry is at a high pressure when delivered from the pump 110. In an embodiment, the pressure entering the devolatilization reactor 200 may be between 300 and 3,500 psia. It should be appreciated that the pressure of the slurry entering the reactor 200 may be between 500 and 2,000 psia, and more preferably between 900 and 1,200 psia. The pressure at which the devolatilization reactor 200 operates is preferably such that the water in the slurry will not flash to steam while heated.

The devolatilization reactor 200 may provide a first stage of feedstock thermal treatment. The feedstock may be treated at high pressure, between 300 and 900 psia, and medium temperature, between 300 and 600 degrees F. The reactor 200 may also treat the feedstock at temperatures between 400 and 500 degrees F., at just above the treatment temperature's steam saturation pressure. The feedstock may have a long residency time within the reactor 200, where the elevated temperatures and high pressure cause reactions in the feedstock which releases gaseous constituents comprising hydrocarbons and other gaseous compounds and elements in a process herein referred to as devolatilization. Residency time within the reactor 200 may be between 5 and 30 minutes. Devolatilization entails the release of volatile constituents of the feedstock such as oxygen, and lighter and more easily released simple hydrocarbons.

In the illustrated embodiment, the feedstock slurry is pumped from the holding tanks 106 through the devolatilization reactor 200 and into the gasifier 112. After the feedstock leaves the reactor 200, the feedstock slurry may be substantially converted to char slurry. Char includes more complex carbon based constituents in solid or liquid form substantially devoid of volatile materials that requires further processing to break down the final carbon bonds and produce synthetic natural gas. The feedstock may then flow through a reactor control valve 114 and enter into the gasifier 112. It may also be returned to the holding tanks 106 along a feedstock recycle line, whereby it is recycled and further treated. Steam may be admitted to the feedstock from a steam header (not shown), prior to entering the gasifier 112.

The gasifier 112 performs a gasification process on the feedstock slurry. As the feedstock passes through the reactor control valve 114, a portion of the water within the slurry will flash to steam. Without being limited to any particular theory of operation, it is believed that as the water flashes, it becomes both a pulverizing force and a motive fluidizing agent which carries the feedstock through the gasifier 112. The steam is also a significant heat transfer medium between the feedstock and the gasifier heating medium. It is also a hydrogenating fluid, as the temperature at which the gasification occurs is within the region where the water-gas shift occurs.

Upon exit, the feedstock enters into a separator 116. The separator 116 may be of standard construction known in the field, and may feature a water bath at the base, where particulates such as ash are collected. The ash may be handled by an ash handling system (not shown). An ash handling system may include slurry pumps, separation tanks, grinder pumps, recycle circuits, transport circuits, and other components known in the art. The ash may be recycled along a recycle line and returned to the holding tanks 106 or it may be transported, for example, by a truck to a material recycler. It should be appreciated that in an alternative embodiment, the power plant 100 may not include a gasifier and the feedstock may directly enter the separator 116 upon exiting the reactor 200.

In the separator 116, thermally converted synthetic natural gas is separated from any entrained ash or slag that is unwanted. To further separate the fine particles, the gas may exit the separator 116 and pass through a screen filter (not shown) and an aftercooler 120. The gas may be cooled and the condensate from the steam may be drained. The filters and aftercooler 120 may be of standard construction as known in the field.

The synthetic natural gas may leave the aftercooler and be routed to gas storage tanks 122, an auxiliary boiler 124, the primary energy generator 102, or combinations thereof. The gas may also be routed to other applications that may require natural gas, such as a booster heater.

The primary energy generator 102 may be a molten carbonate fuel cell (MCFC), a reciprocating engine, gas turbine, boiler, or other commercially available energy generation source. The primary energy generator 102 converts the natural gas into electricity and also produces heat to drive the remainder of this process. The heat produced by the energy generator 102 may be provided to the gasifier heating medium or fluid stored in a gasifier heating medium storage tank 126. In alternate embodiments, the gasifier heating fluid may be heated using coils prior to entering the storage tank 126, by burners upon exiting the storage tank 126, or combinations thereof.

The gasifier heating fluid may be pumped into the gasifier 112 through a gasifier heating fluid control valve 128 along a main path 132 and/or pumped along a bypass 134 through a bypass control valve 130. The bypass 134 rejoins the main path 132 after the gasifier heating fluid flows through the gasifier 112, whereby the heating fluid is exhausted 136 from the system 100. The heating fluid may also be diverted to a reactor heating medium generator 138, through a coil control valve 140, which is used to provide heat to a reactor heating medium used to provide heat to the devolatilization reactor 200. The reactor heating medium may be stored in a storage tank 142. The reactor heating medium may be pumped into the reactor 200 by a pressure pump 146 and may be regulated by a reactor heating fluid control valve 144. In alternate embodiments, prior to the heating fluid being exhausted, it may be admitted to a heat recovery steam generator, hot water generator, or other heat recovery apparatus known in the art. The reactor heating medium is preferably a heating oil, which has been previously heated by any one or combination of sources.

Figure 2:
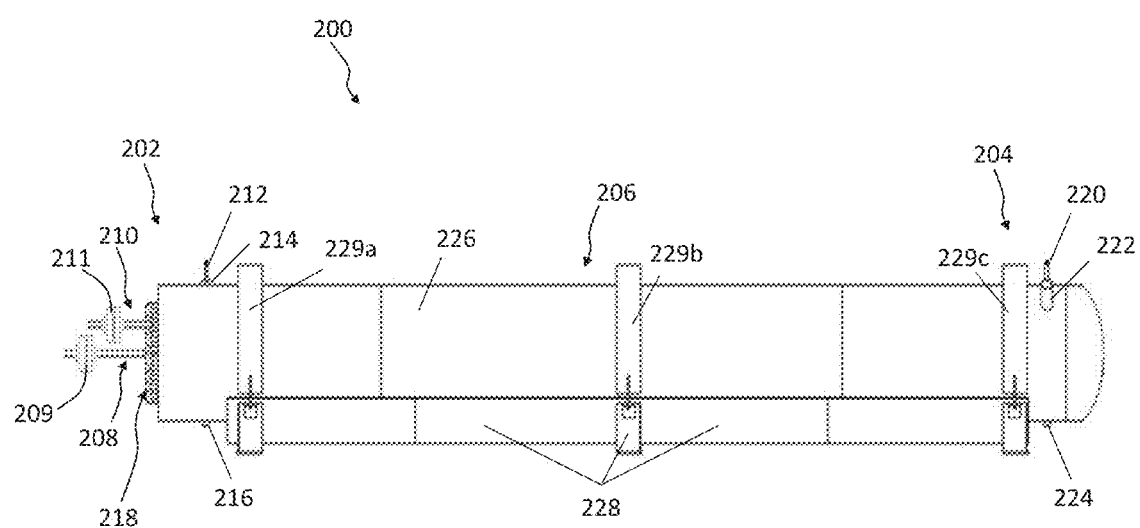
FIG. 2 is an illustration of a side view a physical layout of a devolatilization reactor, according to an aspect of the disclosure.
Figure 3:
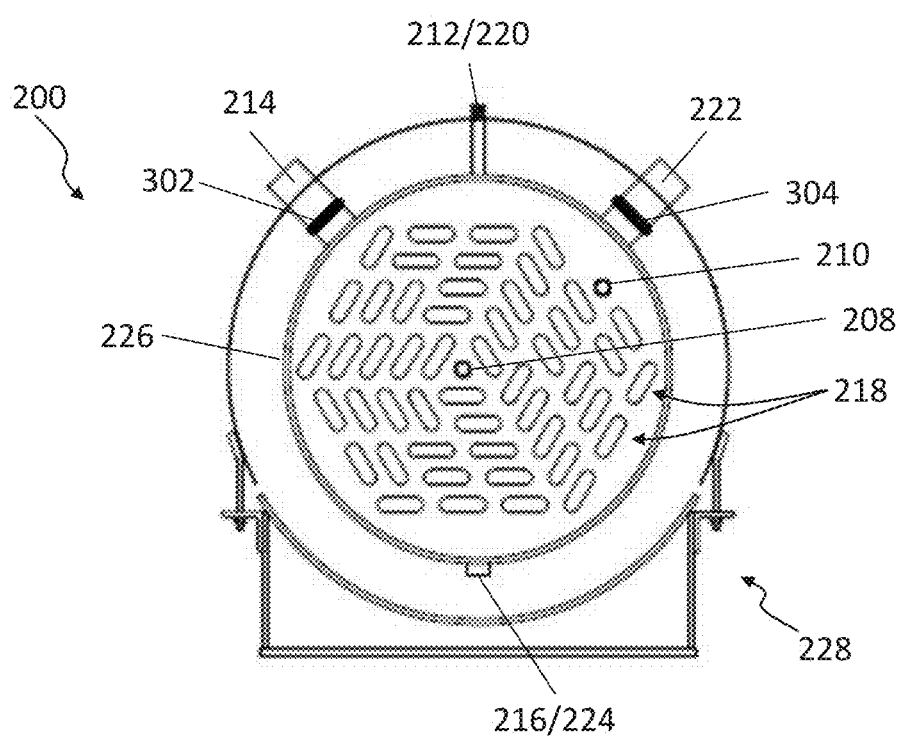
FIG. 3 is an illustration of a front view a physical layout of a devolatilization reactor, according to an aspect of the disclosure.

FIGS. 2 and 3 illustrate a side view and a front view of an embodiment of the devolatilization reactor 200, respectively. The reactor 200 includes a first end 202, a second end 204, and a main body 206. The first end 202 may include an inlet feed pipe 208, an exit feed pipe 210, a vent 212, a heating fluid inlet 214, a drain 216, and feedstock containment tube bends 218. The second end 204 may include a vent 220, a heating fluid outlet 222, and a drain 224. The main body 206 may include a unit shell 226 and a support cradle 228.

The feedstock may enter the reactor 200 through the inlet feed pipe 208 and exit the reactor 200 through the exit feed pipe 210. The inlet feed pipe 208 and the outlet feed pipe 210 may include an overpressure safety device 209 and 211, respectively. The overpressure safety devices 209 and 211 may include safety devices such as relief valves, burst disks, or similar devices known in the art. Each over-pressure safety device 209 and 211 is configured to release feedstock when the feedstock pressure reaches a predetermined threshold. In an embodiment, the predetermined threshold may be set as required by certifying bodies in the field of art. The inlet pipe 208 may also include a metering admission valve (not shown) to regulate the flow of feedstock into the reactor. It should be appreciated that in alternate embodiments, the inlet pipe 208 may also include a block valve, safety relief valve, and/or a control valve, none of which are shown to provide clarity for other features. In alternate embodiments, multiple overpressure safety devices may be included on each of the inlet 208 and outlet 210 feed pipes.

The vents 212/220 may be used for venting out air and/or heating fluid within the unit shell 226. The vents 212/220 may be fluidly connected to expansion tanks (not shown) that recycle the heating fluid, whereby the fluid may be re-admitted to the unit shell 226. The drains 216/224 may be used for draining the heating fluid out of the unit shell 226. A primary use for the drains 216/224 is to drain the unit shell 226 for maintenance purposes.

In an embodiment, the fluid inlet 214 and the fluid outlet 222 may be fitted with overpressure safety devices 302 and 304, respectively (FIG. 3). The overpressure safety devices 302/304 are configured to release the reactor heating fluid into a containment device (not shown) upon a failure. The overpressure safety devices 302/304 may have indicators (not shown) coupled thereto to provide an operator or controller an indication of whether a failure has occurred. A failure may occur if there is an integrity loss in tubes 402 (FIG. 4) that allows the slurry to come into direct contact with the heating fluid. This may cause a rapid expansion in the volume of the water in the slurry and a pressure spike of the heating fluid system. An integrity loss may occur due to over pressurization, manufacturing defect, erosion, corrosion, or any combination thereof of the tubing 402 over time.

The containment device may be configured to couple to the outside of the unit shell 226. The containment device may be used in conjunction with a cooling system sized to cool the heating fluid below the smoke temperature if a critical failure were to occur. In an embodiment, the cooling system may be a $CO_2$ suppression system suspended above the containment device and fitted to the overall equipment enclosure.

The unit shell 226 may contain a plurality of feedstock containment tubes 402 (FIG. 4), baffle cuts 404 (FIGS. 4 and 5), and the reactor heating fluid. The shell 226 is configured to be air tight, whereby no fluid or gas may enter or exit the shell 226 except through the fluid inlet 214 and the fluid outlet 222. The support cradle 228 is configured to be coupled to the outside of the unit shell 226. The cradle 228 may include three straps 229a, 229b, and 229c to hold the unit shell 226 in place. Positioned between the cradle 228 and the straps 229a-229c may be a fire brick (not shown), which may be a structurally supportive thermally insulating material, to further support the shell 226.

Figure 4:
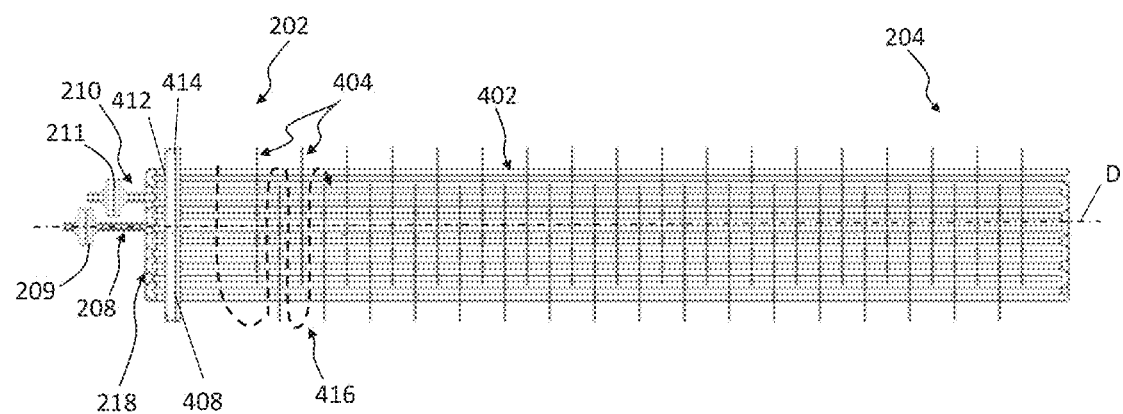
FIG. 4 is an illustration of the inside of a devolatilization reactor, according to an aspect of the disclosure.

FIG. 4 illustrates the interior of the devolatilization reactor 200. The tubes 402 are configured to extend from the first end 202 to the second end 204 of the reactor 200. In an embodiment, each tube 402 may be a mechanically formed u-tube, whereby the tube entrance and tube exit are located at the first end 202. Each tube 402 may be coupled, via a coupling, or welded onto the exterior side 412 of a shell seal 408. Each tube 402 may then be connected to a corresponding tube 402 by connecting a tube bend 218 onto the exterior side 412 of the shell seal 408. In an embodiment, the tube bend 218 may be directly butt-welded to the tube 402, which may create a smooth tube interior to prevent slurry bridging. Additionally, the butt-weld may be exterior to the unit shell 226, and therefore, not in direct contact with the heating fluid within the unit shell 226. The shell seal 408 may be configured to fit within the unit shell 226, whereby it may be connected or coupled, on an outer surface 414 of the seal 408, to an inner surface (not shown) of the unit shell 226, either by welding or other means, such that the heating fluid is sealed within the shell 226. The tube bends 218 are located on the exterior of the unit shell 226. It should be appreciated that the unit 226 can be built at standards that are accepted in the market place.

The cross section (not shown) of each tube 402 and tube bend 218 may have a shape such that the flow of feedstock is facilitated. Accordingly, the cross section may be circular, ellipsoidal, rectangular, or other shape that may define a conduit cross section.

Figure 5:
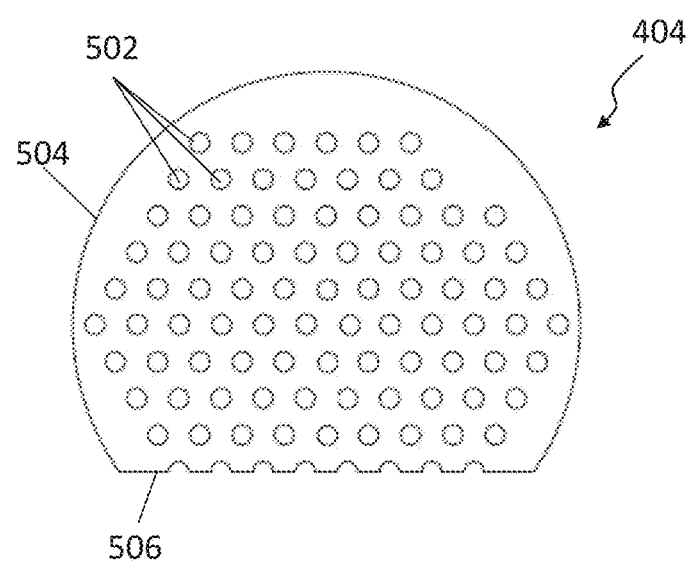
FIG. 5 is an illustration of a front view of a baffle cut, according to an aspect of the disclosure.

Each tube 402 is held into place by a series of baffle cuts 404. FIG. 5 illustrates the front view of an embodiment of a baffle cut 404. Each baffle 404 may define a series of holes 502. Each hole 502 may be configured to support a tube 402 within. In an embodiment, the holes 502 are spaced evenly apart from one another, thereby maximizing the distance between each supported tube 402. The tubes 402 may be slideably placed within the baffle 404, or coupled or connected to the baffle 404.

The baffle 404 is configured to fit within the unit shell 226. A first portion 504 of the outer surface of the baffle 404 may be coupled to the interior surface (not shown) of the unit shell 226. In an embodiment, the baffles 404 are coupled to the unit shell 226 such that no fluid or gas can flow through the coupling. A second portion 506 of the outer surface of the baffle 404 may be spaced from the interior surface of the unit shell 226, thereby defining a hole (not shown).

Referring back to FIG. 4, the series of baffle cuts 404, positioned within the unit shell 226, may be aligned to define a channel 416 (dashed line). Each baffle 404 may be aligned such that each successive baffle 404 is rotated 180 degrees about a central axis D from the preceding baffle 404. The central axis D is defined as the central longitudinal axis of the interior of the reactor 200 that extends from the first end 202 to the second end 204. The channel 416 allows the heating fluid to flow through the unit shell 226 from the fluid inlet 214 to the fluid outlet 222. The channel 416 may define a flow path of the heating fluid that varies axially, radially, or both, relative to the central axis D.

When the feedstock enters the devolatilization reactor 200 through the inlet feed pipe 208, it is routed through the feedstock containment tubes 402 and tube bends 218. Each tube 402 and tube bend 218 may compose a tube bundle, and each reactor 200 may comprise a plurality of tube bundles. The plurality of bundles may be configured to contain slurry at an operating pressure of at least up to about 1,500 psig, which tubes are desirably hydrostatically tested at a pressure of at least about 2,250 psig. In an embodiment, the operating pressure of the plurality of bundles is such that it meets standard methods known in the field of art. The heat from the heating fluid is indirectly applied to the feedstock slurry within the unit shell 226 being pumped through the tube bundle, whereby the heat is applied to the exterior of each tube 402. The heating fluid may have an operating temperature of up to 600 degrees F., whereby the heating fluid has the capability of being heated up to 600 degrees F. However, in alternative embodiments, the temperature of the heating fluid may exceed 600 degrees F. In an embodiment, the heating fluid may include any heating fluid known in the art, such as DuraTherm 600, or heating air or water. The unit shell 226 may be configured to contain up to 700 gallons of heating fluid, however, it should be appreciated that the unit shell 226 may be configured to contain in excess of 700 gallons. The flow rate and temperature of the heating fluid flowing over the exterior of the tubes 402 may be controlled by, for example, one or more heating fluid control valves 144 (FIG. 1).

As the feedstock slurry is admitted to the reactor 200, it may pass through the the inlet feed pipe 208. The flow may be controlled by the reactor control valve 114 and/or the pressure pump 110 which can control the pressure of the slurry.

Each tube 402 positioned within the unit shell 226 may or may not be mechanically enhanced. The tubes 402 may include fins (not shown) on the exterior to make the heat transfer from the heating fluid to the feedstock more efficient.

As the heating fluid enters the reactor 200 through the heating fluid inlet 214, the fluid may pass through a metering device (not shown) which may be capable of volumetric control over the fluid. This may be controlled remotely by a system operator or automated control system.

The unit shell 226 may be fitted with sensors (not shown) to monitor heat transfer of the heating fluid to the feedstock slurry. The sensors may be coupled to the tube bends 218, external to the unit shell 226, or to the interior of the unit shell 226. Sensors exterior to the unit shell 226 may include Forward Looking Infrared (FLIR) cameras (not shown) to measure temperature over residency time at each tube bend 218 for temperature telemetry and profiling. One FLIR camera or multiple FLIR cameras may be used to measure temperatures of all the tube bends 218. This will allow the feedstock slurry to be characterized, whereby if the feedstock is fed into a subsequent reactor, the subsequent reactor may be better tuned or adapted. The information from the sensors may be provided back to a controller or operator. In an alternative embodiment, measuring the temperature at each tube bend 218 may include thermocouples (not shown) attached to each tube bend 218. The thermocouples may also be configured to provide information back to a controller or operator.

Figure 6:
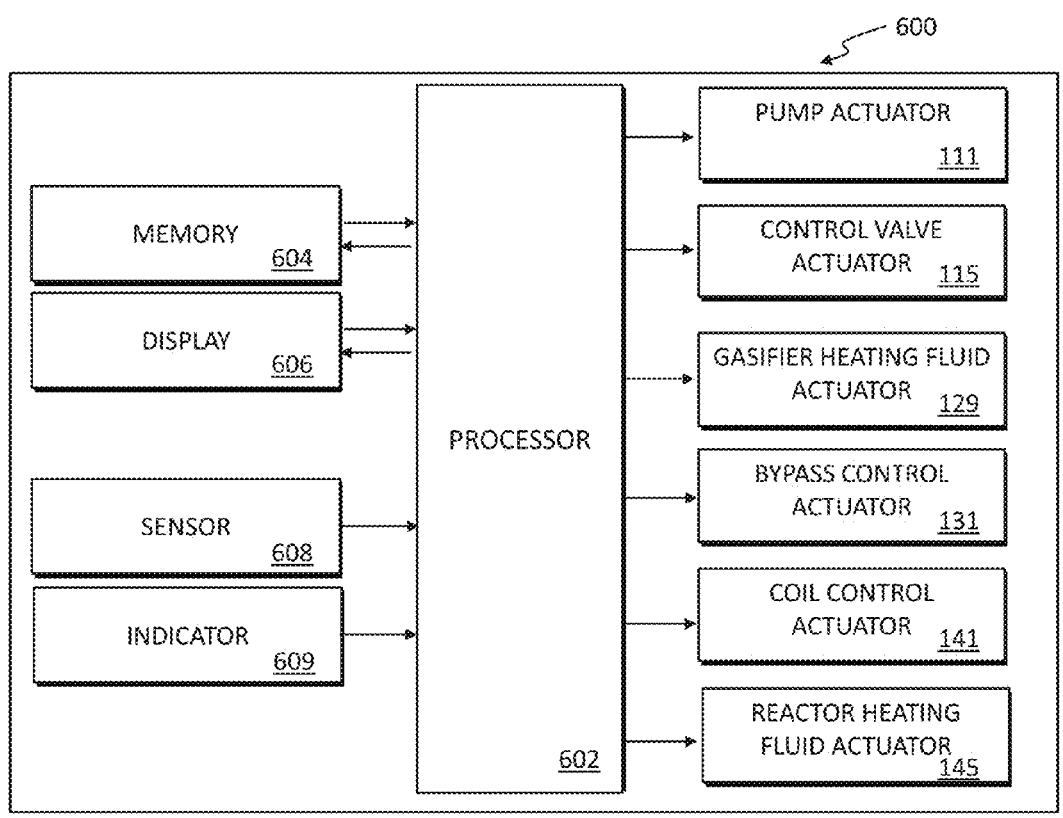
FIG. 6 is a schematic of a controller used to control a devolatilization system, according to one aspect of the disclosure.

The power plant 100 may also include a controller 600, such as an electronic control unit, which may be used to facilitate control and coordination of any methods or procedures described herein. As illustrated in FIG. 6, the controller 600 may include a processor 602, memory 604, and display 606. The processor 602 may be configured to output signals to valve actuators and/or receive values sensed by sensors or gauges 608, such as temperature and pressure of the feedstock and/or heating mediums or fluids. The processor 602 may be further configured to output signals that indicate failures that have been determined by indicators 609. The output signals and sensed values may be stored in memory, shown on a display 606, and used by the controller 600 to control the flow of the feedstock through the power plant 100. In the illustrated embodiment, the actuators include a pump actuator 111, control valve actuator 115, a gasifier heating fluid actuator 129, a bypass control actuator 131, a coil control actuator 141, and a reactor heating fluid actuator 145 coupled to the pump 110, reactor control valve 114, gasifier heating fluid control valve 128, bypass valve 130, coil control valve 140, and reactor heating fluid control valve 144, respectively. It should be appreciated that in other embodiments, additional actuators, sensors, or gauges may be used, for example, to sense and control the pressure and temperature of the feedstock within the reactor 200 and/or the gasifier 112. Additionally, sensors or gauges may be used to sense and control the pressure and temperature of the gasifier heating fluid flowing through the gasifier 112 and the reactor heating fluid flowing through the reactor 200. It should also be appreciated that multiple indicators 609 may be coupled to the overpressure safety devices 209/211 and 302/304 to indicate failures. While the controller 600 is represented as a single unit, in other aspects the controller 600 may be distributed as a plurality of distinct but interoperating units, incorporated into another component, or located at different locations on or off the power plant system 100.

While the disclosure is described herein using a limited number of embodiments, these specific embodiments are not intended to limit the scope of the disclosure as otherwise described and claimed herein. Modification and variations from the described embodiments exist. More specifically, the following examples are given as a specific illustration of embodiments of the claimed disclosure. It should be understood that the invention is not limited to the specific details set forth in the examples.

What is claimed:

1. A reactor comprising:
   a unit shell configured to allow a heating fluid to flow within the unit shell; and
   at least one tube bundle configured to allow feedstock to flow within the tube bundle, and further configured to be positioned at least partially within the unit shell, wherein each at least one tube bundle comprises:

a first at least one tube bend extending from a first end of the unit shell to a second end of the unit shell, the first at least one tube bend having an entrance and an exit located toward the first end of the unit shell, the first at least one tube bend being formed of a single continuous tube;

a second at least one tube bend; and at least one coupling configured to couple together the first at least one tube bend and the second at least one tube bend, wherein each second at least one tube bend is disposed external to the unit shell, and wherein each at least one coupling is external to the unit shell.

2. The reactor of claim 1, wherein the first at least one tube bend and the second at least one tube bend comprise u-tubes.

3. The reactor of claim 1, wherein the at least one coupling is a butt-weld.

4. The reactor of claim 1, further comprising a temperature gauge, wherein the temperature gauge is coupled to the second at least one tube bend to measure the temperature of the feedstock within.

5. The reactor of claim 4, wherein the temperature gauge is a Forward Looking Infrared (FLIR) camera.

6. The reactor of claim 1, wherein the heating fluid is capable of being heated up to 600 degrees Fahrenheit.

7. The reactor of claim 1, wherein the at least one tube bundle is further configured to contain feedstock at a pressure up to 1,500 psig.

8. The reactor of claim 1, further comprising a control valve configured to control the flow rate of the feedstock within the at least one tube bundle.

9. The reactor of claim 1, wherein the unit shell comprises a heating fluid inlet and a heating fluid outlet, wherein the heating fluid enters the unit shell through the heating fluid inlet and exits the unit shell through the heating fluid outlet, and wherein the heating fluid inlet comprises a first overpressure safety device and the heating fluid outlet comprises a second overpressure safety device.

10. The reactor of claim 9, wherein each overpressure safety device comprises an indicator, wherein the indicator is configured to detect failure.

11. The reactor of claim 10, further comprising a containment device configured to contain the unit shell and the at least one tube bundle within.

12. The reactor of claim 11, wherein the containment device comprises a $CO_2$ suppression system configured to cool the heating fluid, wherein when the indicator detects a failure the suppression system will cool the heating fluid.

13. The reactor of claim 1, wherein the tube bundle further comprises an inlet feed pipe and an outlet feed pipe, wherein the feedstock enters the tube bundle through the inlet feed pipe and exits the tube bundle through the outlet feed pipe, and wherein the inlet feed pipe comprises a first overpressure safety device and the outlet feed pipe comprises a second overpressure safety device.

14. The reactor of claim 1, further comprising one or more baffles situated within the unit shell so as to form a channel, wherein the baffles alternate the flow path of the heating fluid within the unit shell.

* * * * *